May 10, 1949.　　　　E. B. NOEL ET AL　　　　2,469,607
ELECTRIC LAMP UNIT
Filed Sept. 20, 1943　　　　　　　　　　　2 Sheets-Sheet 1
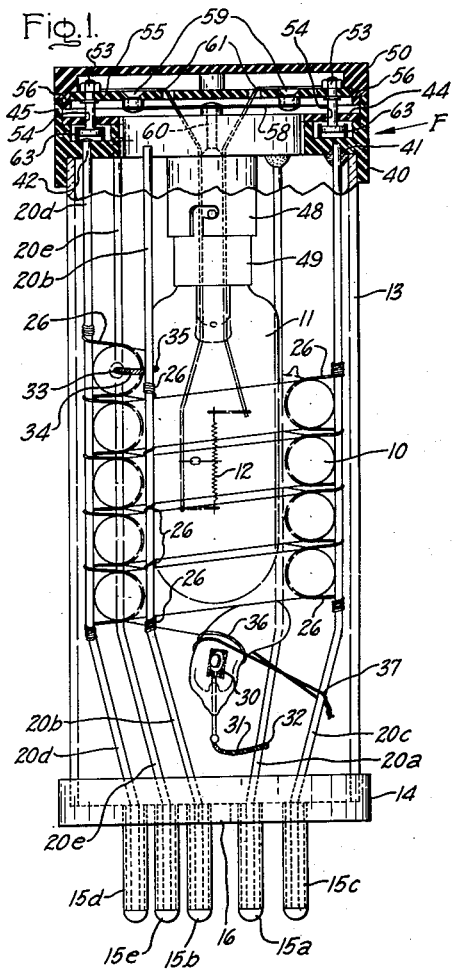
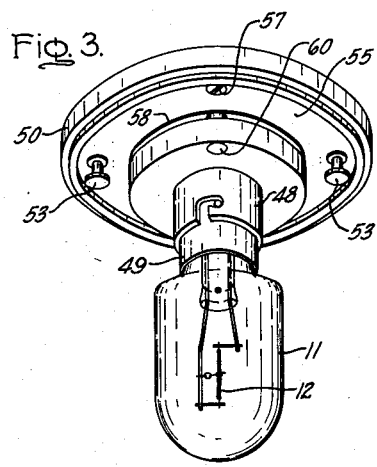
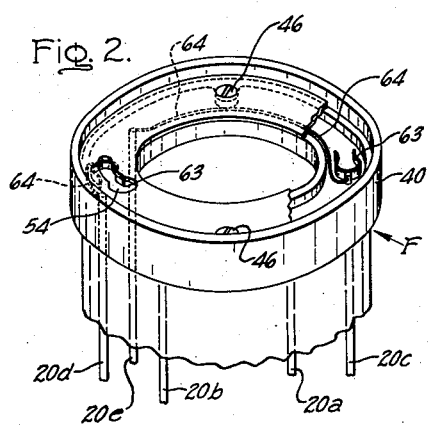
Inventors:
Edward B. Noel,
Paul B. Davis,
by John H. Anderson
Their Attorney.

May 10, 1949.  E. B. NOEL ET AL  2,469,607
ELECTRIC LAMP UNIT
Filed Sept. 20, 1943  2 Sheets-Sheet 2
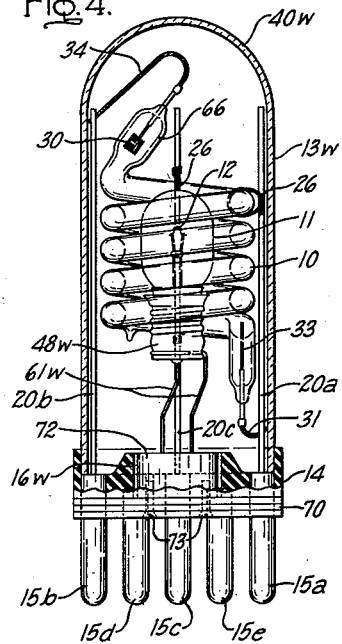
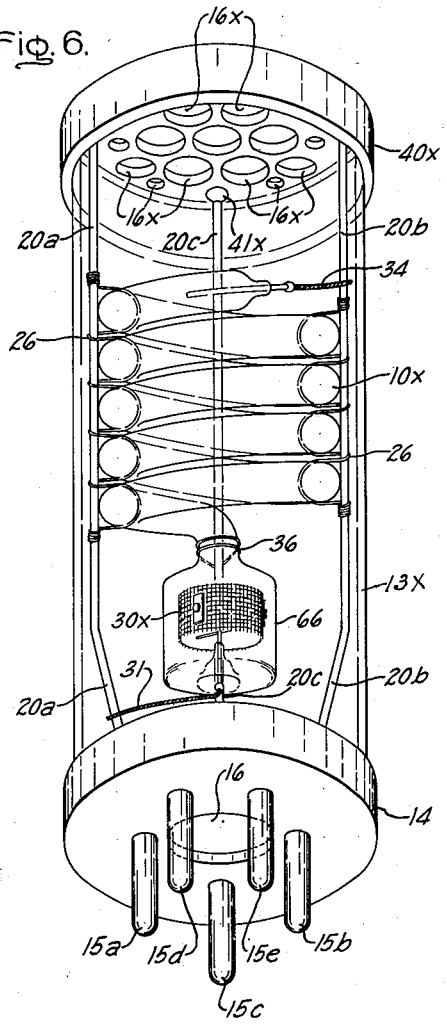
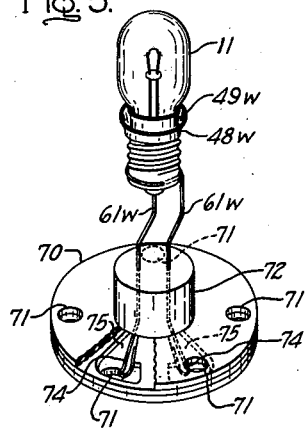
Inventors:
Edward B. Noel,
Paul B. Davis,
by John H. Anderson
Their Attorney.

Patented May 10, 1949

2,469,607

UNITED STATES PATENT OFFICE 2,469,607

ELECTRIC LAMP UNIT

Edward B. Noel, Cleveland Heights, and Paul B. Davis, East Cleveland, Ohio, assignors to General Electric Company, a corporation of New York Application September 20, 1943, Serial No. 503,068

16 Claims. (Cl. 240—1.3)

This invention relates to lighting units, and especially units of a type now often used for photography, which when employed for this purpose provide a more powerful actinic illumination for making an exposure than the light required to enable the photographer to pose or arrange his subject and focus his camera for the desired effect. Such illuminating units may include one light source which provides the preliminary light for "modeling," as it is sometimes called, and another light source which provides the additional light or actinic radiation required for an exposure of desired duration. This latter source need usually be active only for the time of the actual, effective exposure, which may have the brevity of a mere flash, so that this source is often referred to as the "flash lamp," while the other source is called the "modeling lamp." Electric discharge tubes have been found very suitable as flash lamps, while incandescent filament electric lamps have been found desirable as modeling lamps.

Preferably the two light sources of such a combination are assembled and arranged to have virtually a common light center, in order that the highlights and shadows of a subject under the more powerful illumination used in making the exposure shall correspond to those under the weaker illumination. In the case of a discharge tube and incandescent lamp combination, substantial coincidence of light centers may be achieved by having the discharge tube bent or coiled around the incandescent lamp bulb and filament more or less symmetrically. It has been found desirable to mount the two light sources in a common light-transmitting envelope or jacket which may serve both as a protective and dust-excluding enclosure, and as a diffuser or filter to reduce or suppress undesired radiation from either or both sources, besides preventing access to high voltage electrical connections of one or both lamps. But this jacket may be omitted, or may form part of the mounting for the lighting unit, instead of being included as a part of the unit itself.

Though such units are very convenient and effective in use, they are nevertheless subject to an important drawback: viz., the life of the whole unit is terminated by the failure of its shorter-lived component light source, which renders the whole unit practically useless. This is the more regrettable because the component which fails is almost invariably the relatively inexpensive modeling lamp, while the rest of the very expensive unit remains perfectly good for a much longer period of service. Assuming average use of the modeling lamp per picture taken and flash of the discharge tube, a tube may be expected to outlast some five to ten incandescent modeling lamps.

It is an aim of our invention to obviate this draw-back by a novel construction of the unit which allows the modeling lamp to be readily replaced as long as the flash lamp and the rest of the unit remain serviceable, thus greatly increasing the useful life of the unit. The invention also involves improvements in construction that are applicable to lighting units which have only a single light source, such as a tubular discharge lamp without any associated incandescent or modeling lamp.

Other features and advantages of the invention will appear from the description of species and forms of embodiment, and from the drawings.

In the drawing, Fig. 1 is a side view of a lighting unit embodying the invention in one preferred form, certain upper parts being shown partly broken away and in vertical section; Fig. 2 is a tilted top view of the unit with an upper part removed; and Fig. 3 is a tilted view of the removed part from beneath.

Fig. 4 is a view of a modified form of lighting unit, mainly in longitudinal mid-section; and Fig. 5 is a tilted view of a part removed from the rest of the unit, so as to permit renewal of the modeling lamp.

Fig. 6 is a tilted side view of a lighting unit embodying some of the features shown in Fig. 1, but not others.

The lighting unit illustrated in Figs. 1, 2, 3 comprises as its light sources a vitreous discharge tube lamp 10 bent into a compact hollow configuration, and an associated vitreous light bulb 11 mounted in the midst of the hollow lamp tube configuration. As here shown, the discharge tube 10 has the configuration of a helical coil or spiral, of rather more than some four turns, and the light bulb 11 is a tubular incandescent lamp mounted substantially coaxial with the tube helix. Accordingly, the finely coiled incandescent lamp filament 12 extends substantially or approximately axially of the tube helix 10, as well as of the bulb 11. The unit is also shown with a light or radiation-transmitting vitreous outer envelope or jacket 13 enclosing the two sources 10, 11, in the form of a large tube substantially or approximately coaxial with them—although this, as above noted, is not broadly essential, and might be omitted. At one end, the outer tube 13 is based with a base 14 of general radio type, comprising a peripherally flanged disc of "Bakelite" or other suitable insulative plastic carrying contact terminals in the form of (five) outward-projecting hollow pins 15 molded and thereby anchored in the plastic. The orientation of the base pins 15 may preferably correspond to that usual for radio tube bases having the same number of pins. (For the moment, the letters annexed to the reference number 15 on the drawing are disregarded.) The base 14 may be cemented on the end of the tube 13 with any suitable cement, and may have one or more ventilating or air-circulating holes 16 therethrough. Suitable current connections for the lamps 10 and 11 will be described hereinafter.

For supporting the lamp tube 10, a plurality of longitudinal support wires 20 carried by the base 14 extend inward into the tube 13, preferably altogether out of contact with its side walls. (For the moment, the letters annexed to reference number 20 in various instances on the drawing are disregarded.) As here shown, five support wires 20, rather stiffly elastic, are arranged in a group corresponding approximately to the agroupment of the contact pins 15, and have their ends at the base 14 secured and connected in the hollow pins by soldering or welding, thus adapting them to serve also as electric current connections. From the base 14, the wires 20 diverge outward on a slope to points near the tube wall 13, and then extend substantially parallel with the wall 13 toward its other end, forming a sort of stiff elastic "cradle" for the helical tube 10. Rather than depend merely on the elastic frictional engagement of the support wires 20 to keep the tube 10 in place, however, the latter may be secured to the wires 20 more positively, as by finer wire lashings 26 around the wires 20 and the tube 10. As shown, each wire 26 is secured at one end to a wire 20 by wrapping around it just below the lowest helical tube convolution or turn, and is then laced back and forth around the tube turns and said wire 20 to a point above the uppermost tube turn, where its other end is secured to said wire 20 by wrapping around it. To avoid confusion, no effort has been made to show the wire lashing for the support wire 20a behind the tube 10.

The electrode 30 in the lower end of the helical tube 10 (which is shown as first bent in to the axis of the helix, and then downward toward the base 14) is electrically connected to a current lead and support wire 20 that is distinguished as 20a, by means of a lead wire 31 sealed through this tube end and laterally welded to the wire 20a at 32, and the electrode 33 in the upper end of the helical tube (which is not bent inward) is electrically connected to a current lead and support wire 20 that is distinguished as 20b, by means of a lead wire 34 sealed through this tube end and laterally welded to the wire 20b at 35. The leads 31, 34 are shown as including multi-stranded flexible sections, to allow free movement of the tube 10 with the elastic support wires 20. At the lower end of the tube 10, substantially opposite the electrode 30, there is shown a starting or trigger band of rather fine, flexible wire 36, which is looped or wrapped twice around the tube and is also looped around one of the current and support wires 20, distinguished as 20c, at 37, whereby it is electrically connected to this wire 20c. For convenience, the contact terminal pins corresponding to the current and support wires 20a, 20b, 20c are distinguished as 15a, 15b, 15c, respectively.

As shown in Fig. 1, the outer ends of the support wires 20 remote from the base 14 are attached to a structural element 40 which braces them together and serves as an end closure for the envelope tube 13. Preferably this end closure 40 is a separate peripherally flanged annular rim with a central opening of considerable size, made of insulative material similar to the base 14, and similarly cemented on the end of the tube 13. Thus the base 14, rim 40, and interconnecting wires 20 form for the lighting unit a main supporting structure or framework F, which is strengthened and rendered more rigid by the tube 13. To attach the upper ends of the wires 20 to the part 40, they may be engaged and cemented in conically countersunk socket holes 41 in the underside of part 40, as shown for the wire 20c at the extreme right of Fig. 1, or may extend through plain holes 42 in the part 40 and be headed or riveted over, as indicated for the two wires 20d, 20e at the left of Fig. 1. Owing to the fact that the part 40 is in section, the attachment of the upper end of the wire 20b to this part 40 cannot be shown. For purposes that will become apparent hereinafter, the upper, outer side of the part 40 may have an annular recess which is covered over with an annular insulative cover plate 44 (of similar material to the parts 14 and 40) that fits loosely inside a rim 45 and is removably secured by screw(s) 46, Fig. 2.

For removably mounting the light bulb or lamp 11 inside the tube 10, there is shown a bayonet socket 48 for the bayonet-type lamp base 49, with an associated supporting cover 50 (which may be of insulative material similar to that of the parts 14, 40) to be detachably secured over the opening inside the rim 40 of the main supporting structure F, as by means of headed pins 53, 53 on the cover 50 which take through keyhole openings 54, 54 in the rim plate 44 and key under the plate edges at the narrow ends of these openings (Figs. 1 and 2) when the cover 50 is turned clockwise after insertion of the pin-heads through the large ends of the openings 54, 54. For reasons which will presently appear, the cover 50 may itself have at its inner side a recess which is closed in by an insulative cover plate 55 (of similar material to the parts 14 and 40) that fits loosely inside a rim 56 which is rabbeted to fit into the rim 45. The cover plate 55 may be removably secured by screw(s) 57, Fig. 3. The socket 48 is preferably attached to the cover 50 with some freedom for sidewise movement or rocking relative thereto, as by means of a thin, resilient, annular sheet metal disc 58 itself attached to the plate 55 by means of diametrically arranged spacer rivets 59, and similarly attached to the flanged upper end of the socket 48 by means of spacer rivets 60 located 90° from the rivets 59. Such freedom of the lamp 11 to rock relative to the cover 50 obviates possibility of injury to either lamp 10 or lamp 11, when the latter is put in place, in case the lamp 11 should not be quite axially true relative to its base 49, or if the lamp 10 should not be formed or mounted quite true relative to the common axis of the parts 14, 40, etc.

As here shown, two of the support wires 20, which are distinguished as 20d and 20e, also serve as current leads to connect the lamp socket 48 to the corresponding contact terminals 15d, 15e of the base 14; and provision is made for automatically connecting these wires 20d, 20e to the lamp socket 48 when the latter is attached and secured to the supporting structure F by means of the headed pins 53, 53, as above described. For this purpose, there are flexible insulated lead-wires 61, 61 extending from the socket 48 up through the open center of the resilient disc 58 and through holes in the plate 55 into the cavity in the cover 50, where they are connected to the upper ends of the pins 53, 53 secured in this cover; and there are spring clips 63, 63 secured to the rim 40 at the bottom of its annular recess and electrically connected to the upper ends of the wires 20d, 20e by means of lead wires 64, 64. As shown in Fig. 2, the clips 63, 63 are arranged and formed to receive the heads of the pins 53, 53 and resiliently grip them around their peripheries with a snap action when the pin heads are moved into the narrow ends of the keyhole openings 54, 54 to lock the cover 50 on the supporting structure F. Besides making electrical connections to the pins 53, 53, the clips 63, 63 also yieldingly retain them in locking relation to the keyhole slots 54, 54, thus preventing accidental unlocking of the cover 50 and disconnection of the lamp 11.

As shown in Fig. 1, the central opening inside the rim 40 is of ample size to pass the socket 48 and the lamp 11 when the cover 50 is detached, making it easy to renew the lamp 11 as often as necessary. Even with the cover 50 removed, however, the support wires 20a, 20b, 20c which carry high voltage when the lamp 10 is energized or "flashed" are rendered practically inaccessible by the envelope 13 and the rim 40—except, of course, in case of a deliberate effort to reach them with something inserted through the central opening.

Figs. 4 and 5 illustrate a lighting unit, generally similar to that in Fig. 1, in which the incandescent modeling lamp 11 is shown with a transverse and slightly bowed coil filament 12, and is inserted and removed through an enlarged central opening 16w in the base 14, instead of at the opposite end of the unit. Accordingly, the inward-bent and somewhat enlarged lamp tube end 66 is at the end of the unit remote from the base 14, while the tube end adjacent the base is merely bent toward the latter, but not inward. The end 40w of the envelope tube 13w remote from the base 14 is hemispherical, without any opening as in Fig. 1—although broadly speaking this tube 13w is not essential, and might be omitted. Only three longitudinal support wires 20 are provided.

As shown in Fig. 5, the screw socket 48w for the base 49w of the modeling lamp 11 is carried by a base-like closure 70 that is associated with the main base 14. In the present instance, the structure 70 has the form of an insulative disc (as of "Bakelite") that corresponds to the base 14 in outline, is pierced with holes 71 corresponding to the main base contact pins 15, and carries a central insulative fiber plug 72 (secured thereto by screws 73) which loosely occupies the base opening 16w. The screw socket 48w is supported by stout resilient current lead wires 61w, 61w that are attached (as by soldering) to the socket contacts and are fixed in the insulative part 72. The lead wires 61w, 61w connect to spring contacts 74, 74 that are mounted in the thickness of the disc 70 for resiliently engaging the base pins 15d, 15e when the latter are passed through the corresponding disc holes 71. As shown in Figs. 4 and 5, the disc 70 is of triple laminated construction, with large openings 75, 75 in the middle layer to accommodate the contacts 74, 74, which are formed of the bent ends of the lead wires 61w, 61w, while the holes 71 in the outer lamina are only large enough to accommodate the pins 15d, 15e.

When the disc 70 is passed over the base pins 15 in proper orientation and pushed home against the base 14, it is held by friction of the pins in the holes 71 and with the spring contacts 74, 74. The pins 15 may be made of extra length corresponding to the thickness of the disc 70, so that their proper frictional engagement with the contacts of a corresponding socket (not shown) shall not be affected by the presence of the disc. When the base 14 is in the main socket (not shown), it is of course impossible to remove the modeling lamp 11.

In Figs. 4 and 5, various parts and features are marked with the same reference characters as their homologues in Fig. 1, in order to dispense with repetitive description, a distinctive letter being added where such distinction seems necessary.

Fig. 6 illustrates the application of the main structural features above described to a lighting unit having only a helical discharge tube 10x as its lighting source, without any bulb 11. Aside from this omission and the consequent omission of the cover 50 and of the provisions for securing it and electrically connecting the lamp 11 to the support wires, the principal difference is in the structural end member 40x, which is shown as a peripherally flanged cover without any large central opening to pass a lamp bulb, but having a number of ventilating holes 16x therein, as well as conically countersunk socket holes 41x in which the upper ends of all the three support wires 20 shown are cemented fast, as above particularly described with respect to the support wire 20c, Fig. 1. The base pins 15d, 15e corresponding to the omitted support wires 20d, 20e of Fig. 1 are dead. Broadly speaking, the outer jacket 13x is not essential, any more than in Figs. 1 and 4; and with it the part 40x may also be omitted. The lower end of the tube 10x is greatly enlarged to provide a chamber 66 for a large circular electrode 30x, and the starting or trigger band wire 36 surrounds the tube just above this chamber 66. The ventilating opening 16 in the base 14, directly in line with the chamber 66, is much larger than in Fig. 1, to admit ample cooling air to cool the chamber.

In Fig. 6, various parts and features are marked with the same reference characters as their homologues in Fig. 1, in order to dispense with repetitive description, a distinctive letter being added where such distinction seems necessary.

What we claim as new and desire to secure by Letters Patent of the United States is:

1. In a lighting unit, the combination of a supporting structure comprising a base with contact terminals and having at one end an opening for passage of a lamp bulb, and a discharge tube lamp bent into a hollow configuration and supported from said supporting structure with the axis of said configuration extending inward from the base, and having its electrodes electrically connected to contact terminals of the base, of a lamp socket normally extending inward through the said opening of said supporting structure, but separable from the latter outward through said opening, and a lamp bulb mounted in said socket and normally extending inward in the midst of the tube configuration, but withdrawable therefrom outward through said opening with said socket, and means for automatically connecting the lamp socket to contact terminals of said base other than the terminals connected to said discharge tube when the socket is within said opening.

2. In a lighting unit, the combination of a supporting structure which comprises a base with contact terminals for mounting in a socket and which has at one end an opening for passage of a lamp bulb, and a discharge tube lamp bent into a hollow configuration and supported from said supporting structure around an axial line extending inward from the base and having its electrodes electrically connected to contact terminals of said base, with a lamp socket detachably mounted on and secured to said supporting structure to extend inward through its said opening but removable from said structure outward through the opening, a lamp bulb mounted in said socket in the midst of the hollow lamp tube configuration, and means for automatically connecting the lamp socket to contact terminals of said base other than the terminals connected to said discharge tube when the socket is secured to said supporting structure as aforesaid.

3. In a lighting unit, the combination of a supporting structure which comprises a base with contact terminals for mounting in a socket and which has at one end an opening for passage of a lamp bulb, and a discharge tube lamp bent into a hollow configuration and supported from said supporting structure around an axial line extending inward from the base and having its electrodes electrically connected to contact terminals of said base, with a closure for said opening detachably mounted on and secured to said supporting structure, a lamp socket mounted on said closure with freedom for self-adjustment sidewise relative thereto, and a lamp bulb mounted in said socket in the midst of the hollow lamp tube configuration, means for automatically connecting the lamp socket to contact terminals of said base other than the terminals connected to said discharge tube when said closure is secured to said supporting structure.

4. In a lighting unit, the combination of a supporting structure which has at one end a base with contact terminals and which has at its other end an opening for passage of a lamp bulb, and a discharge tube lamp bent into a hollow configuration and supported from said supporting structure around an axial line extending inward from the base and having its electrodes electrically connected to contact terminals of said base, with a lamp socket detachably mounted on and secured to said supporting structure to extend inward through its said opening, but removable from said structure outward through the opening, a lamp bulb mounted in said socket in the midst of the hollow lamp tube configuration, and current leads extending from contact terminals of said base to the open end of said supporting structure for connection to said lamp socket when it is mounted on said supporting structure as aforesaid.

5. In a lighting unit, the combination of a light-transmitting outer tube based at one end with a base having contact terminals, and at its other end having an inward extending rim carrying contact terminals with an opening to pass a lamp bulb, and a discharge tube lamp bent into a hollow configuration resiliently mounted in said outer tube around its axis and having its electrodes electrically connected to contact terminals of said base, with a lamp socket detachably mounted on said rim to extend inward in said opening and carrying contact terminals for engaging those of said rim, a lamp bulb mounted in said socket in the midst of the hollow lamp tube configuration, and current leads extending from contact terminals of said base to those of said rim.

6. In a lighting unit, the combination of a base having contact terminals at one side thereof, support wires carried by said contact terminals extending to the other side of said base, an annular member spaced from said base attached to the ends of said support wires, and carrying contact terminals electrically connected to base contact terminals aforesaid, a discharge tube lamp bent into a hollow configuration around an axial line extending inward from said base attached to support wires aforesaid and having its electrodes electrically connected to contact terminals of said base, with a lamp socket detachably secured to said annular member and carrying contact terminals for engaging those of the annular member, and a lamp bulb mounted in said socket in the midst of the hollow lamp tube configuration.

7. In a lighting unit, the combination of a light-transmitting outer tube based at one end with a base having contact terminals, and at its other end having an inward extending rim carrying contact terminals with an opening to pass a lamp bulb, a group of support wires carried by said contact terminals extending inward into said outer tube altogether out of contact with its side walls and having their inner ends anchored to said rim, and a discharge tube lamp bent into a hollow configuration arranged amongst said support wires out of contact with the outer tube and attached to support wires aforesaid, and also having its electrodes electrically connected to support wires aforesaid, with a lamp socket detachably mounted on said rim to extend inward in said opening, means for electrically connecting said socket to support wires aforesaid, and a lamp bulb mounted in said socket in the midst of the hollow lamp tube configuration.

8. In a lighting unit, the combination of a light-transmitting outer tube based at one end with a base having outward-projecting contact pins and an opening to pass a lamp bulb amongst said pins, and a discharge tube lamp bent into a hollow configuration mounted in said outer tube around its axis and having its electrodes electrically connected to contact pins of said base, with a lamp socket and means for detachably mounting it on said contact pins including supporting means extending inward through said opening, a lamp bulb mounted in said socket in the midst of the hollow lamp tube configuration, and means for electrically connecting said socket to contact pins of said base.

9. In a lighting unit, the combination of a light-transmitting outer tube based at one end with a base having outward-projecting contact pins and an opening to pass a lamp bulb amongst said pins, and a discharge tube lamp bent into a hollow configuration mounted in said outer tube around its axis and having its electrodes electrically connected to contact pins of said base, with a lamp socket and means for detachably mounting it from said base including a disc against the outer side of the base engaged with its said contact pins, a lamp bulb mounted in said socket in midst of the hollow tube configuration, and contacts connected to said socket associated with said disc, for engaging contact pins of said base.

10. A lamp unit comprising, in combination, an electric gaseous conduction flash tube, a support structure for said flash tube including a base having a plurality of adjacent contact terminals for engagement with cooperating contacts in a socket, said flash tube being electrically connected to a pair of said contact terminals, an incandescent lamp mounted contiguous to said flash tube, said flash tube having a useful life materially greater than that of said incandescent lamp, separate support means for said incandescent lamp including a socket for said lamp, the configuration of said flash tube and its support structure being such that the said incandescent lamp is entirely enclosed thereby and is inaccessible for removal directly from its socket, the said support means for said incandescent lamp being detachably mounted on and secured to the said flash tube support structure around an opening therein sufficiently large to pass the incandescent lamp and its socket whereby to permit ready replacement of said incandescent lamp, said incandescent lamp support means further including a pair of contacts electrically connected to contact terminals of said socket and electrically connected to a pair of contact terminals on said base other than the pair connected to said flash tube when said incandescent lamp support means is secured to said flash tube support structure.

11. In a lamp unit, the combination of a base member having a plurality of contact prongs projecting from one side thereof around an aperture in said base member, a lamp mounted on the opposite side of said base member and electrically connected to a pair of said prongs, a second lamp, and a removable support for said second lamp comprising a disc-like member with apertures corresponding to said contact prongs and fitted over said prongs against said base member, said disc-like member carrying a socket to support said second lamp adjacent said first-mentioned lamp and also carrying means for automatically connecting said socket to a pair of said contact prongs when the disc-like member is fitted over said prongs, said socket and the lamp supported thereby being of such size as to pass through the aperture in the base member upon withdrawal of said disc-like member from said prongs.

12. In a lamp unit, the combination of a base member having a plurality of contact prongs projecting from one side thereof around an aperture in said base member, a lamp mounted on the opposite side of said base member and electrically connected to a pair of said prongs, a second lamp, and a removable support for said second lamp comprising a disc-like member at the prong side of said base member having a plurality of apertures therein through which extend said contact prongs, said disc-like member carrying means to support said second lamp adjacent said first-mentioned lamp including a lamp socket, said last-named means and the lamp supported thereby being of such size as to pass through the aperture in the base member upon withdrawal of said disc-like member from said prongs, and resilient contacts carried by said disc-like member and electrically connected to contacts on said lamp socket, said resilient contacts engaging a pair of prongs other than those connected to the first-mentioned lamp.

13. A lamp unit comprising, in combination, a base member having a plurality of contact terminals at one side thereof, a supporting frame comprising a plurality of parallel support conductors having adjacent ends anchored in said base member and extending in circular arrangement from the opposite side of said base and electrically connected to respective ones of said contact terminals, an annular body member of insulating material at the opposite ends of said support conductors having the adjacent ends of said support conductors anchored thereto, an electric gaseous conduction tube of hollow configuration disposed within the framework of said support conductors, means securing said tube to support conductors of said framework, the ends of said tube being electrically connected to a pair of said support conductors, a cap member detachably mounted on said annular body member and carrying support means projecting through the opening in said annular body member to support an incandescent lamp within the hollow configuration of said gaseous conduction tube, an incandescent lamp mounted in said support means, said cap member carrying a pair of contacts for said incandescent lamp engaging cooperating contacts on said annular body member, said cooperating contacts being electrically connected to a pair of said support conductors other than the pair connected to said gaseous conduction tube.

14. In a lamp unit, the combination of an annular base member adapted to accommodate an auxiliary lamp socket in its opening and having a plurality of contact terminals at one side thereof arranged around the said opening, a supporting frame comprising at least three parallel support conductors having adjacent ends anchored in said base member and extending in circular arrangement from the opposite side of said base member and electrically connected to respective ones of said contact terminals, an electric gaseous conduction tube of helical coil configuration disposed within the framework of said support conductors in axial alignment therewith, means securing said tube to the said framework at points intermediate the ends of said tube, and flexible conductors electrically connecting the ends of the tube to a pair of said support conductors.

15. In a lamp unit, the combination of a light transmitting tubular envelope having one closed and one open end, an annular base member attached to the open end of the envelope and adapted to accommodate an auxiliary lamp socket in its opening and having a plurality of mounting and contact prongs on its outer side arranged around the said opening, a supporting frame comprising at least three parallel spaced support conductors having adjacent ends anchored in said base member and extending from the opposite side of said base member into the interior of said envelope and electrically connected to respective ones of said contact terminals, an electric gaseous conduction tube of helical coil configuration disposed in said envelope and within the framework of said support conductors in axial alignment therewith, means securing said tube to the said framework at points intermediate the ends of said tube, and flexible conductors electrically connecting the ends of the tube to a pair of said support conductors.

16. In a lighting unit, the combination of a light-transmitting envelope, an annular base member secured to the end of said envelope and provided with mounting and contact prongs projecting outwardly therefrom around the opening in said base member, a discharge tube in said envelope bent into a hollow configuration and supported from said base member around an axial line extending inward from the base member and having its electrodes electrically connected to contact prongs of said base member, support means carrying a lamp socket having a lamp mounted therein in the midst of the hollow discharge tube configuration but separable therefrom through the opening in the base member, and engagement means on said support means cooperating with said contact prongs to hold said discharge tube and lamp in assembled relationship.

EDWARD B. NOEL.
PAUL B. DAVIS.

REFERENCES CITED

The following references are of record in the file of this patent:

UNITED STATES PATENTS

| Number | Name | Date |
| --- | --- | --- |
| 1,040,412 | Reichl | Oct. 8, 1912 |
| 1,779,073 | Murray | Oct. 21, 1930 |
| 2,102,191 | Barclay | Dec. 14, 1937 |
| 2,152,989 | Ewest | Apr. 4, 1939 |
| 2,168,861 | Blackburn | Aug. 8, 1939 |
| 2,205,672 | Sawyer | June 25, 1940 |
| 2,254,845 | Gustin et al. | Sept. 2, 1941 |
| 2,351,603 | Edgerton | June 20, 1944 |
| 2,267,090 | Freeman | Dec. 23, 1941 |
| 2,272,467 | Kern | Feb. 10, 1942 |
| 2,277,697 | Grier | Mar. 31, 1942 |
| 2,277,698 | Germeshausen | Mar. 31, 1942 |